United States Patent [19]

Major

[11] 4,270,065
[45] May 26, 1981

[54] FOUR POLE WAVE WOUND DIRECT CURRENT MACHINE WITH MULTI-TURN ARMATURE COILS

[75] Inventor: Jeffrey T. Major, Cygnet, Ohio

[73] Assignee: Eltra Corporation, Toledo, Ohio

[21] Appl. No.: 21,454

[22] Filed: Mar. 19, 1979

[51] Int. Cl.³ .............................................. H02K 23/32
[52] U.S. Cl. ..................................... 310/207; 310/224;
310/234
[58] Field of Search ............... 310/195, 180, 184, 185,
310/188, 131, 177, 140–142, 198–208, 234, 233,
223–226, 265, 46; 29/596, 597; 318/495, 497,
499; 322/90

[56] References Cited

U.S. PATENT DOCUMENTS

| | | | |
|---|---|---|---|
| 1,406,184 | 2/1922 | Haas | 310/201 |
| 1,685,752 | 9/1928 | Powell | 310/195 |
| 2,477,951 | 8/1949 | Baumann | 310/180 |
| 2,546,735 | 3/1951 | Fry | 310/195 |
| 2,668,926 | 2/1954 | Johnson | 310/265 |
| 2,714,174 | 7/1956 | Applegate | 310/265 |
| 3,239,703 | 3/1966 | Long | 310/265 |
| 3,506,864 | 4/1970 | Miller | 310/234 |
| 3,535,573 | 10/1970 | Appleton | 310/234 |
| 3,705,459 | 12/1972 | Biddison | 310/198 |
| 3,733,506 | 5/1973 | Jaffe | 310/198 |
| 4,197,475 | 4/1980 | Ban | 310/203 |

Primary Examiner—R. Skudy
Attorney, Agent, or Firm—Oliver E. Todd; James P. DeClercq

[57] ABSTRACT

This invention relates to an improved armature for a four pole wave wound direct current machine and also to a method for winding the armature for such a machine. A plural turn winding is free formed or wound in place to substantially a final shape with two ends spaced for connection to commutator segments spaced substantially 180° apart on the armature and with at least four sides defining at least two open turns. The winding sides are spaced for engaging slots in the armature core which are spaced substantially 90° apart. The winding is initially free formed and the turns are separated as necessary to insert the winding on the core and to position the winding sides in their assigned slots in the armature core.

5 Claims, 8 Drawing Figures

FOUR POLE WAVE WOUND DIRECT CURRENT MACHINE WITH MULTI-TURN ARMATURE COILS

BACKGROUND OF THE INVENTION

This invention relates to electric generator and motor structures and more particularly to an improved four pole wave wound direct current rotary machine having plural turn open windings on an armature.

For four pole wave wound direct current motors operated at relatively low speeds and/or relatively high voltages, there is a tendency for excessive currents to flow in armature windings having only a single turn. One common method for limiting the currents in the armature windings is to form the windings with a plurality of turns. An armature of this type for a D.C. motor is illustrated, for example, in U.S. Pat. No. 3,506,864 which is directed to winding an armature with a plurality of turns extending between two spaced slots in a laminated core. However, armatures of this type are only practical with thin flexible wire having a round cross section. It is often desirable to wind the armature with wire having a square or rectangular cross section. Such a wire cross section increases the efficiency of the armature by completely filling the space within each armature slot, as distinguished from having perhaps 25% or more air space in each armature slot when round wires are used. Heretofore, when heavy gauge wires and rectangular cross section wires were used for winding armatures, it was necessary either to limit each winding to a single turn in order to place the conductor in the armature slot or to form each winding from a plurality of sections which are welded or soldered together to form a continuous conductor. This greatly increases the complexity and cost of manufacturing the armature.

The prior art has also suggested that the number of armature windings may be increased, for example, by doubling the number of windings in each armature core slot. One winding is connected between two commutator segments spaced substantially 180° apart and a second winding in the same core slot is connected between the adjacent two commutator segments, also spaced substantially 180° apart. However, this arrangement requires twice as many commutator segments than in a conventional armature having only single turn windings. The prior art also has suggested that a double winding may be applied to the armature in four slots mechanically spaced 90° apart about the armature. However, the prior art has indicated that such an arrangement is not applicable to four pole machines, since the winding ends must be connected to commutator segments spaced 360° apart. See the treatise by A. S. Langsdorf, "Principles of Direct-Current Machines", Fifth Edition, published in 1940 by McGraw Hill Book Company (New York and London), pages 317-365, especially pages 348 and 349, or the Sixth Edition, published in 1959, pages 45 to 90, especially pages 64 and 65.

SUMMARY OF THE INVENTION

According to the present invention, a method is provided for placing a plural turn winding on an armature core for a four pole wave wound direct current machine and also an improved armature for such a machine is provided. The basic armature is of a conventional design in that it has a commutator formed from a plurality of commutator segments mounted adjacent one end of a shaft and a slotted, laminated core mounted on a central region of the shaft. According to the present invention, a plurality of windings, each having at least two open turns, are mounted in the core slots. Each winding is electrically connected between two commutator segments which are spaced substantially 180° apart about the axis of the armature. The four sides of each winding which form two open turns are mounted in four slots which are spaced 90° apart about the armature axis. Where the windings are formed with round wire of a sufficiently small gauge as to be deformable, each winding may be free formed on substantially a flat surface to define the open turns. The free formed winding then is wrapped around the armature core and the sides of the turns are positioned within their assigned slots. With heavier gauge wire or with wire having a rectangular cross section, the winding is free formed to its final shape. The winding turns are spread apart to permit positioning the winding over the core and inserting each side of the winding in its assigned slot. After the winding is placed in the slots in the armature core, two ends of the winding are connected to risers for two commutator segments which are spaced substantially 180° apart. By free forming each winding to substantially its final shape and using open turns as distinguished from closed turns, it is possible to wind armatures with relatively heavy gauge wire having a rectangular cross section and with a plurality of turns for each winding. In the past, it was not possible to wind armatures in this manner.

Accordingly, it is an object of the present invention to provide an improved armature and method for winding an armature for a four pole wave wound direct current machine.

Another object of the invention is to provide an improved armature and a method for winding an armature for a four pole wave wound direct current machine with a plurality of turns of heavy gauge rectangular cross section wire for each winding.

Other objects and advantages of the invention will become apparent from the following detailed description, with reference being made to the accompanying drawings.

DESCRIPTION OF THE PREFERRED EMBODIMENTS

Figure 1:
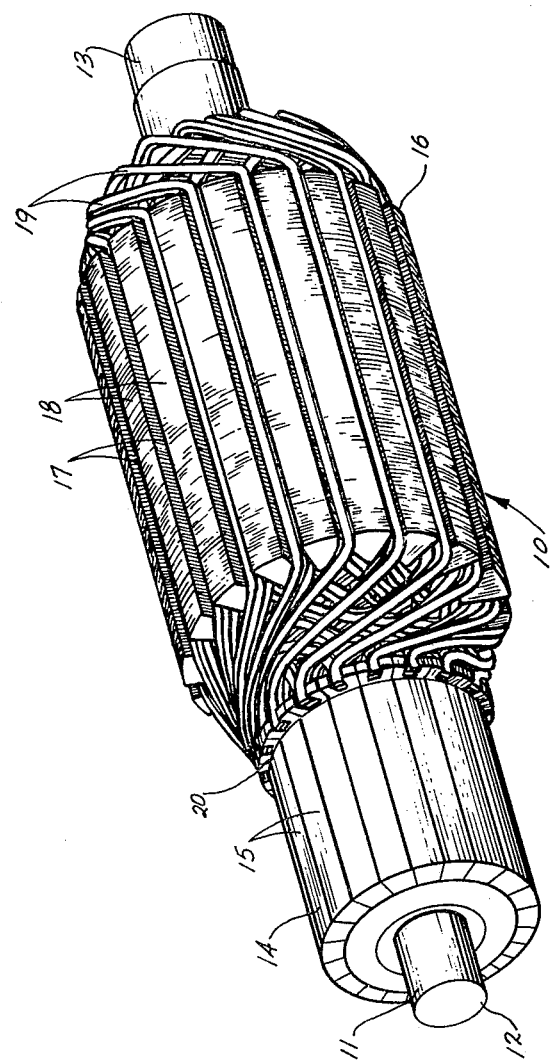
FIG. 1 is a perspective view of an exemplary armature for a four pole wave wound direct current machine constructed in accordance with the present invention.

Turning now to the drawings and particularly to FIG. 1, an armature 10 is illustrated constructed in accordance with the present invention for use in a four pole wave wound direct current motor. The armature 10 has a shaft 11 which is supported at ends 12 and 13 by bearings mounted on a motor housing (not shown). A commutator 14 having a plurality of bars or segments 15 is mounted on the shaft 11 with the segments 15 circumferentially spaced about the armature shaft 11 and electrically insulated from each other. A laminated core 16 extends between the commutator 14 and the shaft end 13. The laminated core 16 is formed from a ferromagnetic material and has alternating slots 17 and teeth 18 formed in its outer surface and extending in a direction parallel with the axis of the shaft 11. A plurality of open turn windings 19 are positioned within the core slots 17. Each winding 19 forms at least two turns having four sides which are positioned in four different slots 17 spaced substantially 90° apart about the core 16. Each winding 19 is formed from a single continuous electrical conductor and has two ends which are connected to two of the commutator segments 15 spaced substantially 180° apart about the axis of the armature shaft 11. A riser 20 is provided at the end of each of the commutator segments 15 adjacent the laminated core 16 for connecting the ends of two windings to each commutator segment 15. The armature 10 is provided with identical pluralities of commutator segments 15, core slots 17 and windings 19. For a four pole wave wound machine, the number of segments and windings is always odd. Since each winding 19 is positioned in four different slots 17, each slot 17 will contain the side or legs of four different ones of the windings 19.

Figure 2:
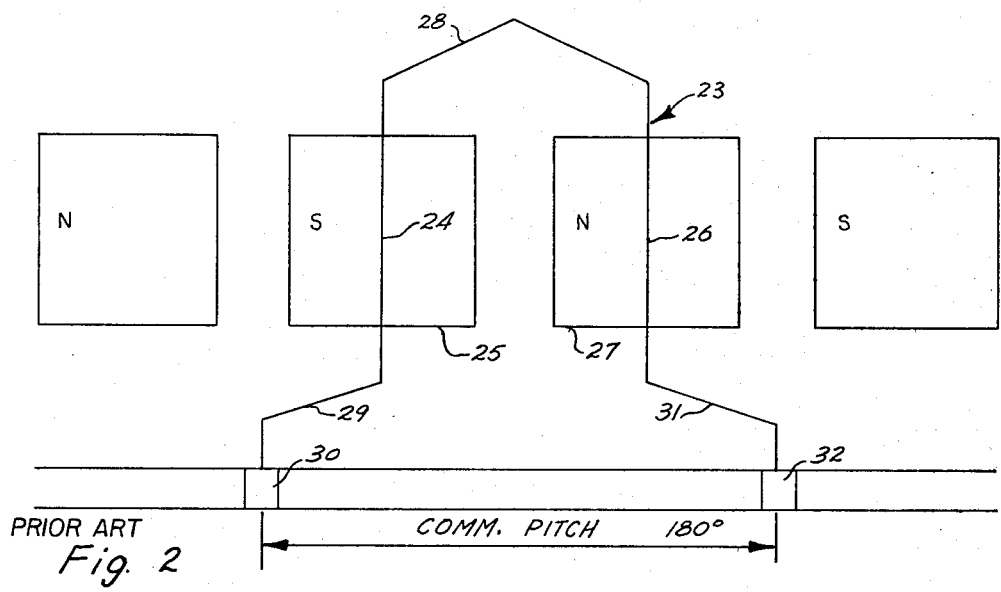
FIG. 2 is a fragmentary diagram illustrating one prior art method for connecting a single turn winding between two commutator segments on a four pole direct current machine.

Turning for a moment to FIGS. 2-5, prior art methods for winding the armature for four pole direct current machines are illustrated. FIG. 2 is a pictorial illustration of a single conventional winding 23 for a four pole machine. Of course, the machine will have a plurality of similar windings connected to commutator segments spaced around the armature. The winding 23 has a side 24 which is shown positioned adjacent a south pole 25 and a side 26 which is shown positioned adjacent a north pole 27. A knuckle 28 interconnects one end of the two sides 24 and 26. The other end of the side 24 is connected through a leg 29 to a commutator segment 30 and the other end of the side 26 is connected through a leg 31 to a commutator segment 32. The commutator segments 30 and 32 are spaced apart a distance equal to one-half the number of commutator segment bars minus one-half, or approximately 180°. This conventional wave winding is normally satisfactory. However, excessive currents can occur with this winding arrangement in, for example, D.C. motors operated at relatively high voltages or at relatively low speeds.

Figure 3:
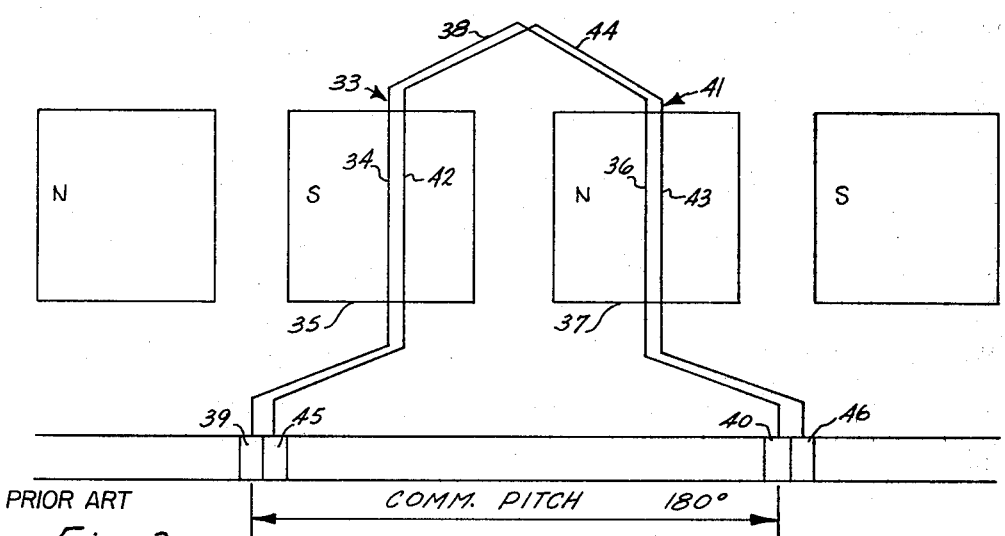
FIG. 3 is a fragmentary diagram illustrating a prior art method for doubling the number of windings on a four pole direct current machine.

FIG. 3 illustrates a method for increasing the number of winding turns on the armature for a four pole wave wound direct current machine. In this arrangement, the number of windings are doubled, as are the number of commutator segments. One winding 33 has a side 34 shown in a position adjacent a south pole 35 and a side 36 shown positioned adjacent a north pole 37. The sides 34 and 36 each have one end which is interconnected by a knuckle 38. The other end of the side 34 is connected to a commutator segment 39 and the other end of the side 36 is connected to a commutator segment 40, with the segments 39 and 40 spaced substantially 180° apart on the armature. A second winding 41 is shown positioned adjacent and in the same armature core slots as the winding 33 or in an adjacent slot. The winding 41 has a side 42 positioned adjacent the south pole 35 and a side 43 positioned adjacent the north pole 37. The sides 42 and 43 are interconnected at one end by means of a knuckle 44. The side 42 has a second end connected to a commutator segment 45 and the side 43 has a second end connected to a commutator segment 46. The segments 45 and 46 are spaced substantially 180° apart on the armature and also are located respectively, adjacent the commutator segments 39 and 40. Although this arrangement is used commercially, there are several disadvantages. In this arrangement, two coils go in each slot or in adjacent slots and the number of commutator segments or bars is often twice the number of slots. This complicates both commutation and construction. Often, the commutator segments become too narrow to function properly. Furthermore, since the number of commutator segments must be odd for wave windings, a dead or unconnected winding must be used if the number of windings resulting is even.

Figure 4:
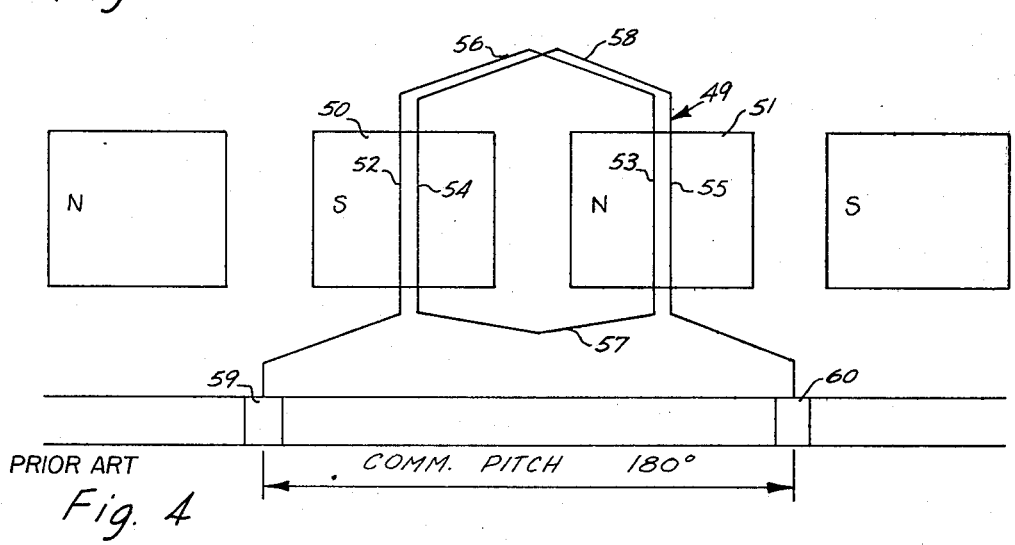
FIG. 4 is a fragmentary diagram illustrating another prior art method for doubling the number of turns of an armature for a four pole direct current machine.

FIG. 4 illustrates another method for increasing the number of winding turns on the armature of a four pole wave wound direct current machine. Each winding is in the form of a two turn closed loop. A single winding 49 of the plurality of armature windings is illustrated positioned adjacent a south pole 50 and a north pole 51. The winding 49 has four sides 52-55. The sides 52 and 54 are positioned adjacent the south pole 50 and the sides 53 and 55 are positioned adjacent the north pole 51. Ends of the sides 52 and 53 are interconnected by a knuckle 56, ends of the sides 53 and 54 are interconnected by a knuckle 57 and ends of the sides 54 and 55 are interconnected by a knuckle 58. The remaining end of the side 52 is connected to a commutator segment 59 and the remaining end of the side 55 is connected to a commutator segment 60. The commutator segments 59 and 60 are spaced substantially 180° apart on the armature. By doubling the number of turns of the winding 49 over the winding 28 shown in FIG. 2, the applied voltage may be doubled. Furthermore, this arrangement does not require additional commutator segments as does the arrangement shown in FIG. 3. However, the winding 49 is in the form of a closed loop which is difficult to insert into armature cores with heavy gauge conductors and is difficult to form with rectangular wire.

Figure 5:
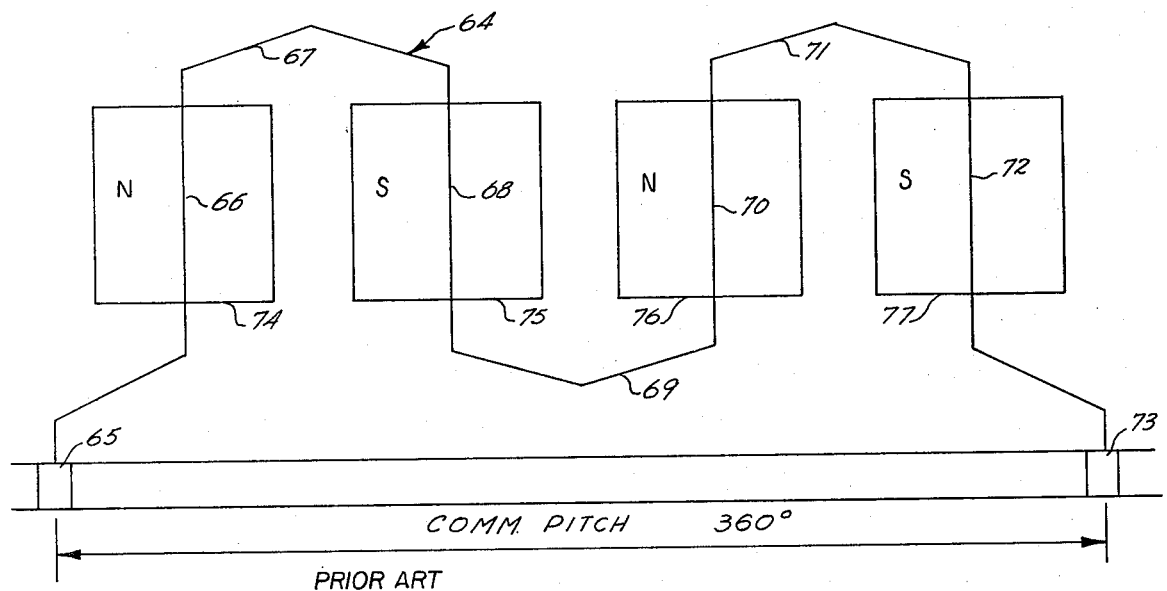
FIG. 5 is a fragmentary diagram illustrating still another method for doubling the number of armature turns on a four pole direct current machine.

FIG. 5 illustrates a method for winding an armature for a four pole wave wound direct current machine having two open turns per winding. An exemplary winding 64 illustrated in the block diagram of FIG. 5 extends from a commutator segment 65, along a side 66, a knuckle 67, a side 68, a second knuckle 69, a side 70, a third knuckle 71, a side 72 and thence to a commutator segment 73. The winding 64 is illustrated in a position with the side 66 adjacent a north magnetic pole 74, the side 68 adjacent a south magnetic pole 75, the side 70 adjacent a north magnetic pole 76 and the side 72 adjacent a south magnetic pole 77. However, according to the teachings of the prior art, such as Langsdorf's book *Principles of Direct Current Machines*, 5th Edition, this arrangement is not satisfactory for a four pole machine since the commutator segments 65 and 73 must be positioned 360° apart. Therefore, the commutator segments 65 and 73 must lie on top of each other. This arrangement clearly is not functional. Therefore, the prior art shows that an open double turn winding of the type shown in FIG. 5 cannot be used in a four pole machine.

Figure 6:
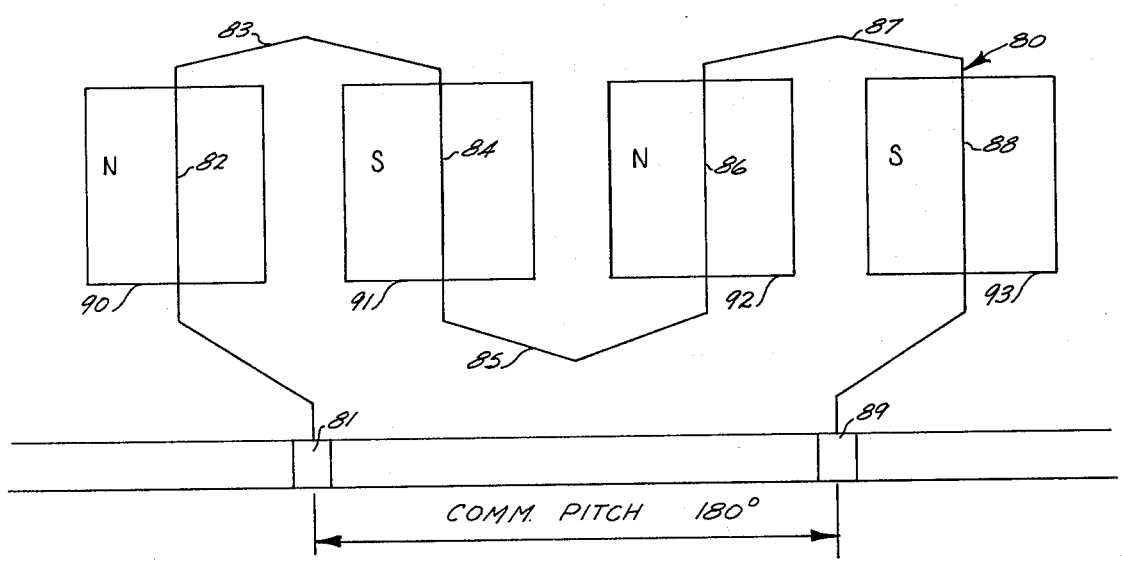
FIG. 6 is a fragmentary diagram illustrating the method of the present invention for doubling the number of winding turns on the armature of a four pole direct current machine.

Turning now to FIG. 6, a pictorial illustration shows the connection of an examplary two turn winding 80 on the armature of a four pole wave wound direct current machine in accordance with the present invention. The winding 80 is illustrated as having two open loops. The winding 80 extends from a commutator segment 81 along a side 82, through a knuckle 83, along a side 84, through a knuckle 85, along a side 86, through a knuckle 87, along a side 88 and is terminated at a commutator segment 89. The side 82 is illustrated adjacent a north magnetic pole 90, the side 84 is illustrated adjacent a south magnetic pole 91, the side 86 is illustrated adjacent a north magnetic pole 92 and the side 88 is illustrated adjacent a south magnetic pole 93. Of course, as the armature rotates, the relative position of the sides 82, 84, 86 and 88 with respect to the poles 90–93 will change. It will be seen that the winding 80 forms two open loops, with the sides 82 and 84 and the interconnecting knuckle 83 forming one loop and the sides 86 and 88 and the interconnecting knuckle 87 forming the second open loop. Unlike the winding 64 illustrated in FIG. 5, the winding 80 illustrated in FIG. 6 is connected between commutator segments 81 and 89 which are spaced approximately 180° apart on the armature. Since there are four active winding sides 82, 84, 86 and 88 as compared to the two active sides 24 and 26 for the single turn winding 23 shown in FIG. 2, the voltage applied to the winding 80 in FIG. 6 may be doubled over the voltage applied to the winding 23 shown in FIG. 2. It will be noted that the armature for the winding 80 can be constructed with the same number of commutator segments and the same number of slots as the armature for the winding 23 shown in FIG. 2. The primary difference is that there will be four conductors or winding sides in each slot for the armature illustrated in FIG. 6 whereas there are only two winding sides in each slot for the armature illustrated in FIG. 2. Or, two of the four conductors or winding sides can be placed in each of two adjacent slots.

Figure 7:
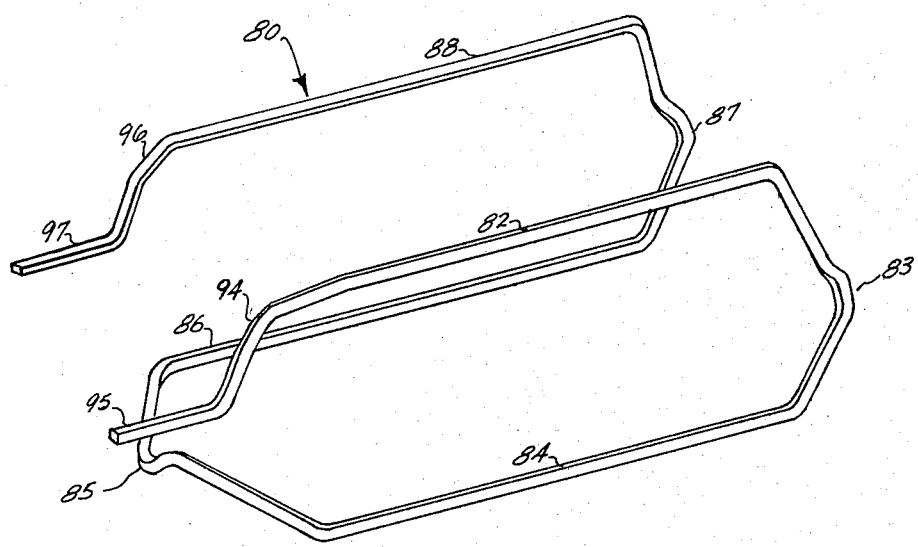
FIG. 7 is a perspective view of a free formed continuous elongated conductor for forming a two turn winding of the armature of a four pole wave wound direct current machine in accordance with one embodiment of the invention.

Turning now to FIG. 7, the final form for the winding 80 on a motor armature is illustrated in its free form prior to positioning on the motor armature. The winding 80 is free formed to have its final shape with the sides 82, 84, 86 and 88 spaced parallel and generally forming the outline of the long sides of a box having rectangular sides and square ends. The spacings between the sides 82, 84, 86 and 88 are substantially identical to their final spacings when they are positioned within their assigned slots on the armature core which are spaced substantially 90° apart. One end of the winding side 82 is connected through a leg 94 to an and 95 and one end of the side 88 is connected through a leg 96 to an end 97. The ends 95 and 97 are connected, respectively, to risers for the commutator segments 81 and 89 on the armature. Where the winding 80 is formed from heavy gauge wire or from wire having a rectangular cross section and preferably a square cross section, the winding 80 is formed to substantially its exact final dimensions as shown in FIG. 7. The winding 80 is then spread apart as far as is necessary to insert the winding 80 about the armature core and to position the sides 82, 84, 86 and 88 within their assigned slots on the armature core. Through this arrangement, it is possible to wind a multiple turn winding from rectangular or round cross section wire. As used herein, rectangular cross section wire includes wire with a square cross section. This was not possible with prior art multiple turn windings, such as the winding 49 illustrated in FIG. 4. The only prior art method known for positioning multiple turn windings of rectangular cross section wire on an armature requires forming the windings from segments which are inserted in sections and welded or soldered together to form connections at the knuckles, as illustrated in U.S. Pat. No. 1,849,215.

Figure 8:
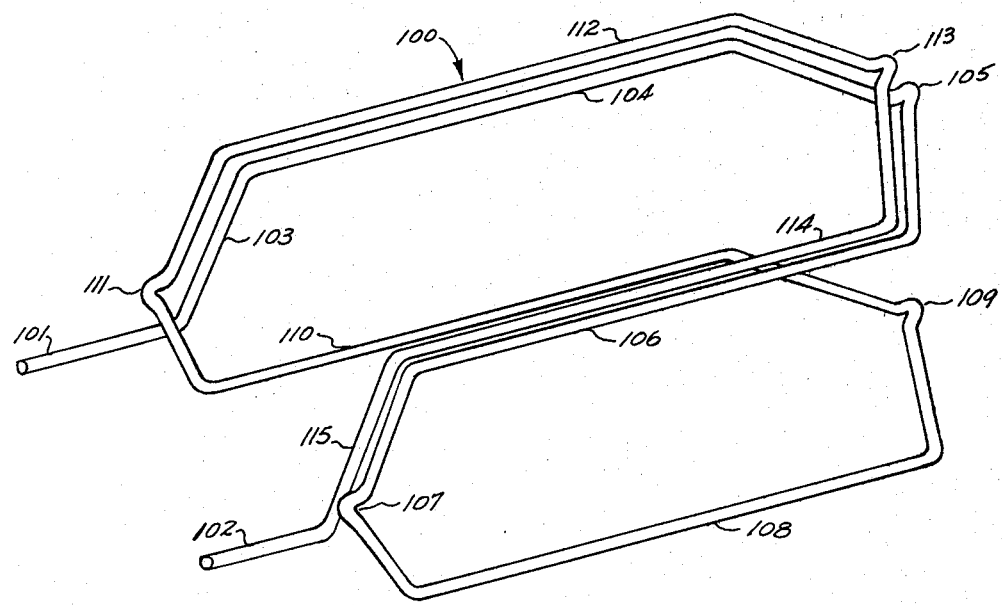
FIG. 8 is a perspective view of a free formed winding for forming three open turns on the armature of a four pole wave wound direct current machine in accordance with another embodiment of the invention.

Turning now to FIG. 8, a winding 100 for a four pole wave wound direct current machine is illustrated as including three open turns instead of the two open turns shown in the winding 80. The winding 100 is formed from a single continuous conductor which may have a round or rectangular cross section. The winding 100 has two ends 101 and 102 which are connected to risers on two commutator segments which are spaced substantially 180° apart on an armature. The end 101 is connected through a leg 103 to a side 104 and thence through a knuckle 105 to a side 106, through a second knuckle 107 to a side 108, from the side 108 through a knuckle 109 to a side 110, from the side 110 through a knuckle 111 to a side 112, from the side 112 through a knuckle 113 to a side 114, and from the side 114 through a leg 115 to the end 102. The sides 104 and 106 form a first open turn, the sides 108 and 110 form a second open turn and the sides 112 and 114 form a third open turn to define a three open turn winding configuration. When the winding 100 is placed on an armature, the sides 104 and 112 are positioned abutting in the same winding core slot and the sides 106 and 114 are positioned abutting in the same winding core slot. The two abutting sides 104 and 112, the two abutting sides 106 and 114, the side 108 and the side 110 are placed in four different slots which are spaced substantially 90° apart about the axis of the armature. Provided sufficient spacing is available in the armature core slots, the winding 100 may be further modified to provide four or more open turns by adding two additional sides and an interconnecting knuckle for each additional turn. In each case, the winding is free formed prior to positioning on the armature. The coils of the free formed winding are deformed or separated to permit positioning the winding over the armature core with the sides of the winding located in their assigned slots.

It will be noted that in the description of the invention, the two commutator segments to which the ends of a winding are connected have been described as being spaced substantially 180° apart. This is due to the fact that the armature is provided with an odd number of commutator segments. As the number of commutator segments increases, the spacing of the two commutator segments connected to the two ends of a winding will gradually approach 180°. For example, if an armature is provided with seventeen commutator segments and seventeen slots, the two commutator segments connected to the end of a plural turn winding are spaced approximately 169° apart. On the other hand, if the number of commutator segments is increased to forty-five segments, then the two commutator segments connected to the end of a winding are spaced 176° apart or much closer to the desired 180° spacing. As used herein, a spacing of "substantially 180°" between two commutator segments connected to the ends of a winding refers to the closest possible spacing, depending upon the number of commutator segments on an armature. Similarly, the spacing between the four slots receiving the sides of a two open turn winding in accordance with the present invention has been described as being either "approximately 90° apart " or "substantially 90° apart". This spacing will vary somewhat depending upon the actual number of slots in the armature core. In each case, the sides of a winding are placed in slots which are spaced as close as possible to 90° apart and such a spacing has been referred to as "approximately 90°" or "substantially 90°".

It will be appreciated that various other modifications and changes may be made to the above-described preferred embodiments of the invention without departing from the spirit and scope of the following claims.

What I claim is:

1. A wave wound armature for a 4-pole direct-current machine comprising a plurality of commutator segments spaced around said armature and electrically insulated from each other, a laminated core having an outer surface defining a plurality of parallel spaced slots each having first and second ends with said first ends adjacent said commutator segments, and a plurality of continuous electrical conductors each having two ends electrically connected to a different two of said commutator segments spaced substantially 180° apart about said armature, each of said conductors following a different path extending continuously from one of the two connected commutator segments to the first end of a first slot, along the first slot, from the second end of the first slot to a second end of a second slot spaced substantially 90° about said armature from said first slot, along the second slot, from the first end of the second slot to the first end of a third slot spaced substantially 90° about said armature from said second slot and substantially 180° about said armature from said first slot, along the third slot, from the second end of the third slot to the second end of a fourth slot spaced substantially 90° about said armature from said third slot and between said first and third slots, along the fourth slot, and from the first end of the fourth slot to the other of the two connected commutator segments whereby each conductor forms at least two open turns on said armature.

2. A wave wound armature for a 4-pole direct-current machine, as set forth in claim 1, wherein each conductor follows a path from the fourth slot for such conductor to the other connected commutator segment extending continuously from the first end of the fourth slot for such conductor to the first end of the first slot for such conductor, along such first slot for such conductor, from the second end of such first slot for such conductor to the second end of the second slot for such conductor, along such second slot for such conductor, and from the first end of such second slot for such conductor to the other connected commutator segment whereby each conductor forms at least three open turns on said armature.

3. A wave wound armature for a 4-pole direct-current machine, as set forth in claims 1 or 2, wherein each of said plurality of conductors has a rectangular cross section.

4. For a 4-pole wave wound direct-current machine having an armature including a plurality of commutator segments and a laminated core with a plurality of slots formed therein, a method for placing a winding on said armature comprising: free forming a continuous elongated conductor having two ends into a plurality of turns with each of said turns having two sides, said formed conductor having substantially a final shape of said conductor on said core and having four of said sides spaced to engage four different slots in said core spaced approximately 90° apart; spreading said sides apart and positioning said formed conductor about said armature core, and positioning said four sides in said four different slots in said core.

5. A method for placing a winding on an armature for a 4-pole wave wound direct-current machine, as set forth in claim 1, and further including the step of attaching said conductor ends to two different commutator segments spaced substantially 180° apart about said armature.

* * * * *

UNITED STATES PATENT AND TRADEMARK OFFICE
CERTIFICATE OF CORRECTION

PATENT NO. : 4,270,065
DATED : May 26, 1981
INVENTOR(S) : Jeffrey T. Major

It is certified that error appears in the above-identified patent and that said Letters Patent are hereby corrected as shown below:

Column 2, line 58, change "of", second appearance, to --on--.
Column 5, line 60, change "and 95" to --end 95--.

Signed and Sealed this

Fifteenth Day of September 1981

|SEAL|

Attest:

GERALD J. MOSSINGHOFF

Attesting Officer      Commissioner of Patents and Trademarks